(12) United States Patent
Ito et al.

(10) Patent No.: US 6,675,886 B2
(45) Date of Patent: Jan. 13, 2004

(54) VEHICULAR AIR CONDITIONER WITH A SINGLE-ACTUATOR DOOR DRIVE SYSTEM

(75) Inventors: Koichi Ito, Kariya (JP); So Hibino, Anjo (JP)

(73) Assignee: Denso Corporation, Kariya (JP)

( * ) Notice: Subject to any disclaimer, the term of this patent is extended or adjusted under 35 U.S.C. 154(b) by 80 days.

(21) Appl. No.: 09/974,600

(22) Filed: Oct. 9, 2001

(65) Prior Publication Data

US 2002/0195227 A1 Dec. 26, 2002

(30) Foreign Application Priority Data

Oct. 11, 2000 (JP) .................................... 2000-310866

(51) Int. Cl.⁷ ............................................... B60H 1/00
(52) U.S. Cl. ........................ 165/204; 165/202; 165/42
(58) Field of Search ............................... 165/202, 204, 165/42, 43, 203

(56) References Cited

U.S. PATENT DOCUMENTS

| | | | |
|---|---|---|---|
| 5,025,711 A | * | 6/1991 | Cassidy |
| 5,235,866 A | * | 8/1993 | Truman et al. ............ 165/42 X |
| 6,009,934 A | * | 1/2000 | Sunaga et al. ................ 165/42 |
| 6,092,592 A | * | 7/2000 | Toyoshima et al. ......... 165/204 |
| 6,138,749 A | * | 10/2000 | Kawai et al. ................ 165/204 |
| 6,179,044 B1 | * | 1/2001 | Tabara .......................... 165/42 |
| 6,253,841 B1 | * | 7/2001 | Obara et al. ................. 165/204 |
| 6,273,811 B1 | * | 8/2001 | Pawlak, III ............... 165/42 X |
| 6,484,755 B1 | * | 11/2002 | Schwarz ................... 165/42 X |
| 2002/0170707 A1 | * | 11/2002 | Shibata ....................... 165/202 |

* cited by examiner

Primary Examiner—Ljiljana Ciric
(74) Attorney, Agent, or Firm—Harness, Dickey & Pierce, PLC

(57) ABSTRACT

In a vehicle air conditioner with a door driving system, a distribution link rotated by a single actuator is provided. One surface of the distribution link is provided with a temperature-control engagement groove through which a temperature control pattern is cyclically repeated plural times, and the other surface of the distribution link is provided with a mode-switching engagement groove through which a mode switching door is driven to a predetermined mode position in accordance with rotation of the distribution link.

19 Claims, 12 Drawing Sheets

VEHICULAR AIR CONDITIONER WITH A SINGLE-ACTUATOR DOOR DRIVE SYSTEM

CROSS-REFERENCE TO RELATED APPLICATION

This application is related to and claims priority from Japanese Patent Application No. 2000-310866 filed on Oct. 11, 2000, the content of which is hereby incorporated by reference.

BACKGROUND OF THE INVENTION

1. Field of the Invention

The present invention relates to a driving system for driving mode switching doors and a temperature control unit such as an air mixing door and a hot water valve in a vehicle air conditioner.

2. Description of Related Art

In a conventional vehicle air conditioner, an inside/outside switching door, mode switching doors and a temperature control unit such as an air mixing door and a hot water valve are independently operated by actuators (servomotors), respectively. Therefore, many actuators are required, thereby increasing production cost of the vehicle air conditioner.

SUMMARY OF THE INVENTION

In view of the foregoing problems, it is a first object of the present invention to provide a vehicle air conditioner in which a temperature control unit and a mode switching member can be operated by one actuator while a temperature control can be performed in the entire temperature range between the lowest temperature and the highest temperature in each air outlet mode.

Further, it is a second object of the present invention to provide a vehicle air conditioner where an automatic mode and a manual mode can be set while a temperature control unit and a mode switching member can be operated by one actuator. In the automatic mode, one of air outlet modes is automatically switched in accordance with an operation position of the temperature control unit. In the manual mode, the air modes are manually switched at any time by an operation of a passenger.

According to the present invention, a temperature control unit for controlling the temperature of air blown into the passenger compartment is provided, a mode switching member for opening and closing openings from which air is blown toward plural positions of a passenger compartment is provided to selectively switch to one mode from a plurality of air outlet modes, and a single actuator is provided for driving both the temperature control unit and the mode switching member through a link member. In the air conditioner, the temperature control unit is changed by a temperature control pattern between the lowest temperature position and the highest temperature position in every predetermined operation range of the actuator. The temperature control unit is operated by a plurality of temperature control patterns being cyclically repeated in the entire operation range of the actuator, and the actuator is provided to operate the mode switching member at a predetermined air outlet mode corresponding to each temperature control pattern.

Accordingly, the air temperature control and the mode switching operation can be performed by a single actuator. In each of the plurality of air outlet modes, the temperature control can be performed in the entire temperature range between the lowest temperature and the highest temperature of the temperature control unit using the temperature control pattern where the control position of the temperature control unit is changed between the lowest temperature position and the highest temperature position in each of the air outlet modes. Thus, when a defroster mode, where air is blown from a defroster opening toward a windshield, is set as one mode of the air outlet modes, the defroster mode can be set at any time such as a time where the windshield is fogged.

Preferably, the link member is disposed to have a predetermined stopping area between adjacent two temperature control patterns, an operation position of the temperature control unit is fixed even when the actuator operates in the predetermined stopping area, and the mode switching member performs a mode switch operation when the actuator operates in the predetermined stopping area. Accordingly, the temperature control unit and the mode switching member can be suitably driven by the single actuator.

More preferably, in one of the temperature control patterns, when the operation position of the temperature control unit is changed between the lowest temperature position and the highest temperature position, the mode switching door automatically switches between the air outlet modes in a predetermined automatic control pattern. On the other hand, in each of the other temperature control patterns, even when the operation position of the temperature control unit is changed between the lowest temperature position and the highest temperature position, the mode switching member sets one fixed air outlet mode. In addition, the air outlet modes fixed in the other temperature control patterns, respectively, are different from each other. Accordingly, in the automatic mode, one of air outlet modes is automatically switched in accordance with an operation position of the temperature control unit. On the other hand, in the manual mode, the air modes are manually switched at any time by an operation of a passenger.

Preferably, the link member includes a distribution link rotated by the actuator. One surface of the distribution link defines a temperature-control engagement groove through which the operation position of the temperature control unit is changed based on the temperature control patterns. The other surface of the distribution link defines a mode-switching engagement groove through which the mode switching member is operated to a position corresponding to a predetermined air outlet mode. Therefore, the temperature control unit and the mode switching member can be readily driven by the single actuator through the link member.

Further, the mode switching engagement groove has an automatic setting groove for automatically switching between the air outlet modes using the mode switching member, and a manual setting groove for manually switching between the air outlet modes using the mode switching member. The mode switching member automatically switches between the air outlet modes through the automatic setting groove in accordance with a change of the operation position of the temperature control unit in a first operation range of the distribution link, and the mode switching member is fixed to one of the mode operation positions through the manual setting groove irrespective of the change of the operation position of the temperature control unit in a second operation range different from the first operation range of the distribution link.

Alternatively, the link member includes a first position adjusting mechanism for adjusting the operation position of the temperature control unit in accordance with a rotation position of the actuator, and a second position adjusting mechanism for adjusting an operation position of the mode switching member in accordance with the rotation position of the actuator. Further, the temperature control pattern is cyclically repeated a plurality of times through the first position adjusting mechanism, and the second position adjusting mechanism adjusts the operation position of the mode switching member in accordance with a cyclical change of the temperature control pattern. Accordingly, the temperature control unit and the mode switching member can be readily and accurately operated by the single actuator.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Figure 1:
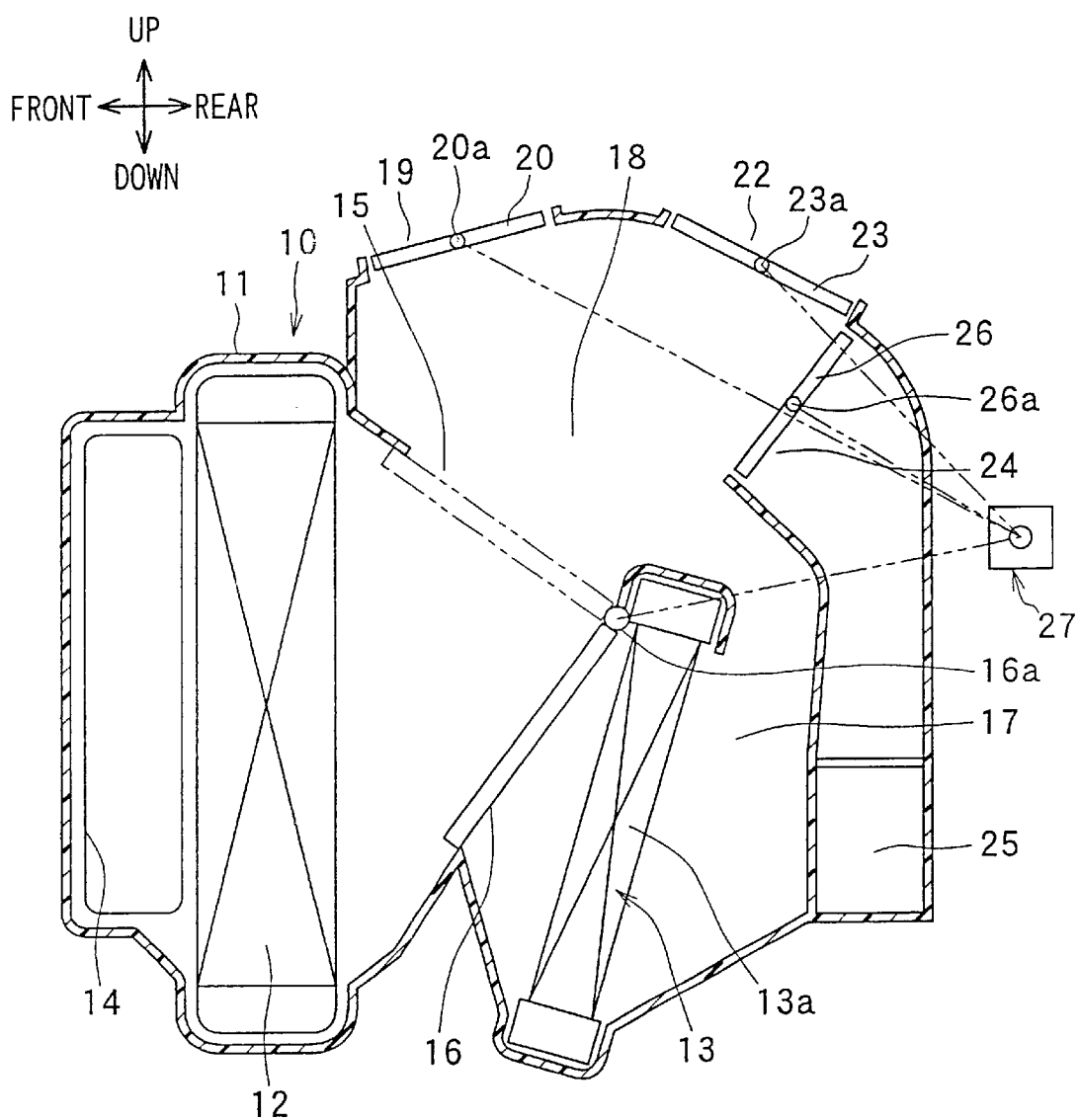
FIG. 1 is a schematic sectional view showing a main part of a vehicle air conditioner according to a first preferred embodiment of the present invention.

Preferred embodiments of the present invention will be described hereinafter with reference to the accompanying drawings.

A first preferred embodiment of the present invention will be now described with reference to FIGS. 1–9. In the first embodiment of the present invention, a vehicle condi- tioner is a semi-center arrangement type, for example. An air conditioning unit 10 of the vehicle air conditioner is disposed in a vehicle to correspond to the arrangement shown in FIG. 1 in a vehicle up-down direction and a vehicle front-rear direction. The air conditioning unit 10 is disposed inside a dash board located at a front side in a passenger compartment, at a substantially center portion in a vehicle right-left direction.

A blower unit (not shown), for blowing air into the air conditioner 10, is disposed to be offset from the air conditioning unit 10 to a side (assistant seat side) in the vehicle right-left direction. As is known well, the blower unit includes an inside/outside switching box for switching and introducing inside air or outside air. Further, the blower unit includes a centrifugal electrical blower fan for blowing air, introduced from the inside/outside switching box, toward the air conditioning unit 10.

The air conditioning unit 10 includes an air conditioning case 11 made of a resin, for defining an air passage through which air flows from a vehicle front side to a vehicle rear side while passing through an evaporator 12 and a heater core 13 disposed therein.

In the air passage of the air conditioning case 11, the evaporator 12 positioned at an upstream air side of the heater core 13 is disposed at a vehicle front side of the heater core 13. As well known, the evaporator 12 is a cooling heat exchanger for cooling air by absorbing heat from air as evaporation latent heat of refrigerant in a refrigerant cycle. The heater core 13 is a heating heat exchanger for heating air using hot water (cooling water) from a vehicle engine as a heating source. The air conditioning case 11 has an air inlet portion 14, from which air blown from the blower unit flows into the air passage, on a side surface thereof at the vehicle front side and at a side of the assistant seat.

A cool air bypass passage 15 is provided in the air conditioning case 11 at an upper side of the heater core 13, and a plate-like air mixing door 16 is disposed immediately at a downstream air side of the evaporator 12 (rear side of the vehicle) rotatably around a rotation shaft 16a. The air mixing door 16 controls temperature of air to be blown into a passenger compartment to a requested temperature by adjusting a mixing ratio between air passing through the cool air bypass passage 15 and air passing through a core portion 13a of the heater core 13. That is, in the first embodiment, the air mixing door 16 constitutes a temperature control unit for air blown into the passenger compartment.

A warm air passage 17 is provided to extend in the up-down direction at a position immediately after the heater core 13. Warm air from the warm air passage 17 and cool air from the cool air bypass passage 15 are mixed in an air mixing space 18 of the air conditioning case 11.

Plural air openings through which conditioned air is blown into the passenger compartment are provided in the air conditioning case 11 at a downstream air side of the air passage. Among the air openings, a defroster opening 19 is provided in the air conditioning case 11 on an upper side surface at a substantial center in the vehicle front-rear direction. Conditioned air is blown toward an inside surface of a windshield of the vehicle from the defroster opening 19 through a defroster duct (not shown). The defroster opening 19 is opened and closed by a plate-like defroster door 20 disposed rotatably around a rotation shaft 20a.

A face opening 22 is provided in the air conditioning case 11 on the upper side surface at a rear side position of the defroster opening 19. Conditioned air is blown toward the head portion of a passenger in the passenger compartment from the face opening 22 through a face duct (not shown). The face opening 22 is opened and closed by a plate-like face door 23 disposed rotatably around a rotation shaft 23a.

A foot opening 24 is provided in the air conditioning case 11 at a lower side of the face opening 22, to communicate with foot air outlets 25 provided at right and left sides of the air conditioning case 11 on a downstream air side. Warm air is blown toward the foot portion of a passenger from the foot air outlets 25. The foot opening 24 is opened and closed by a plate-like foot door 26 disposed rotatably around a rotation shaft 26a.

In FIG. 1, the openings 19, 22, 24 are opened and closed by the three doors 20, 23, 26, respectively. However, the defroster opening 19 and the face opening 22 can be opened and closed by a common single door as known well, or the face opening 22 and the foot opening 24 can be opened and closed by a common single door.

One side end portions of the rotation shaft 16a of the air mixing door 16, the rotation shaft 20a of the defroster door 20, the rotation shaft 23a of the face door 23 and the rotation shaft 26a of the foot door 26 protrude outside the air conditioning case 11, and are linked to one actuator 27 through a link mechanism and the like of a door driving system. In the first embodiment of the present invention, by operation of the actuator 27, the air mixing door 16 for a temperature control and the mode switching doors 20, 23, 26 are opened and closed.

For example, the actuator 27 is a direct current motor (servomotor) with a position detection portion for detecting a rotational position. In this case, the actuator 27 can control a rotational position thereof at a predetermined rotational position and can be rotated clockwise or counterclockwise. As the actuator 27, a step motor and the like can be used. In this case, a rotational position of the actuator 27 can be controlled at a predetermined rotational position using pulse number signals inputted thereto.

Next, the door driving system for driving the air mixing door 16 and the mode switching doors 20, 23, 26 using the single actuator 27 will be now described with reference to FIGS. 2–4.

Figure 2:
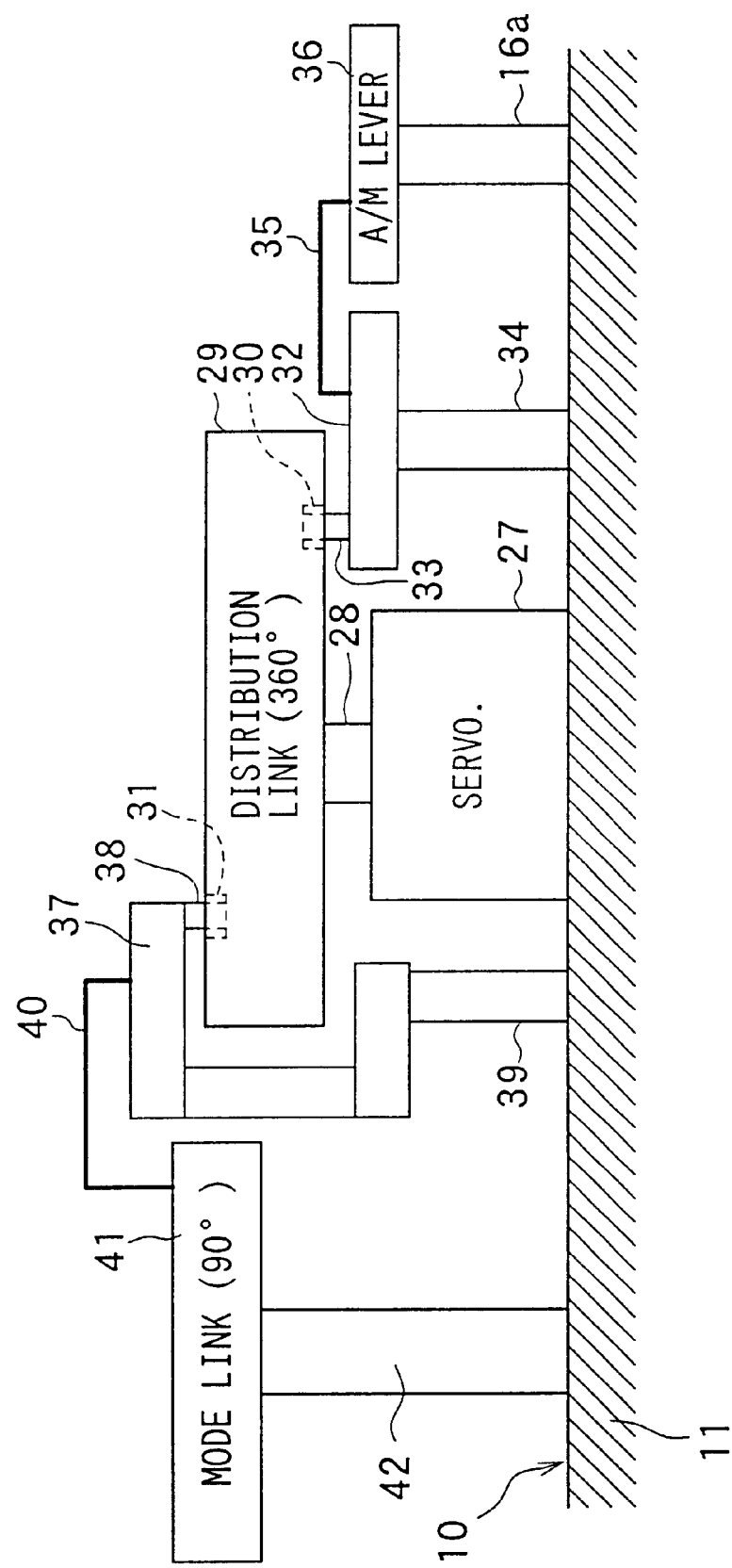
FIG. 2 is a schematic view showing a link mechanism of a door driving system used for the vehicle air conditioner of the first embodiment.
Figure 3:
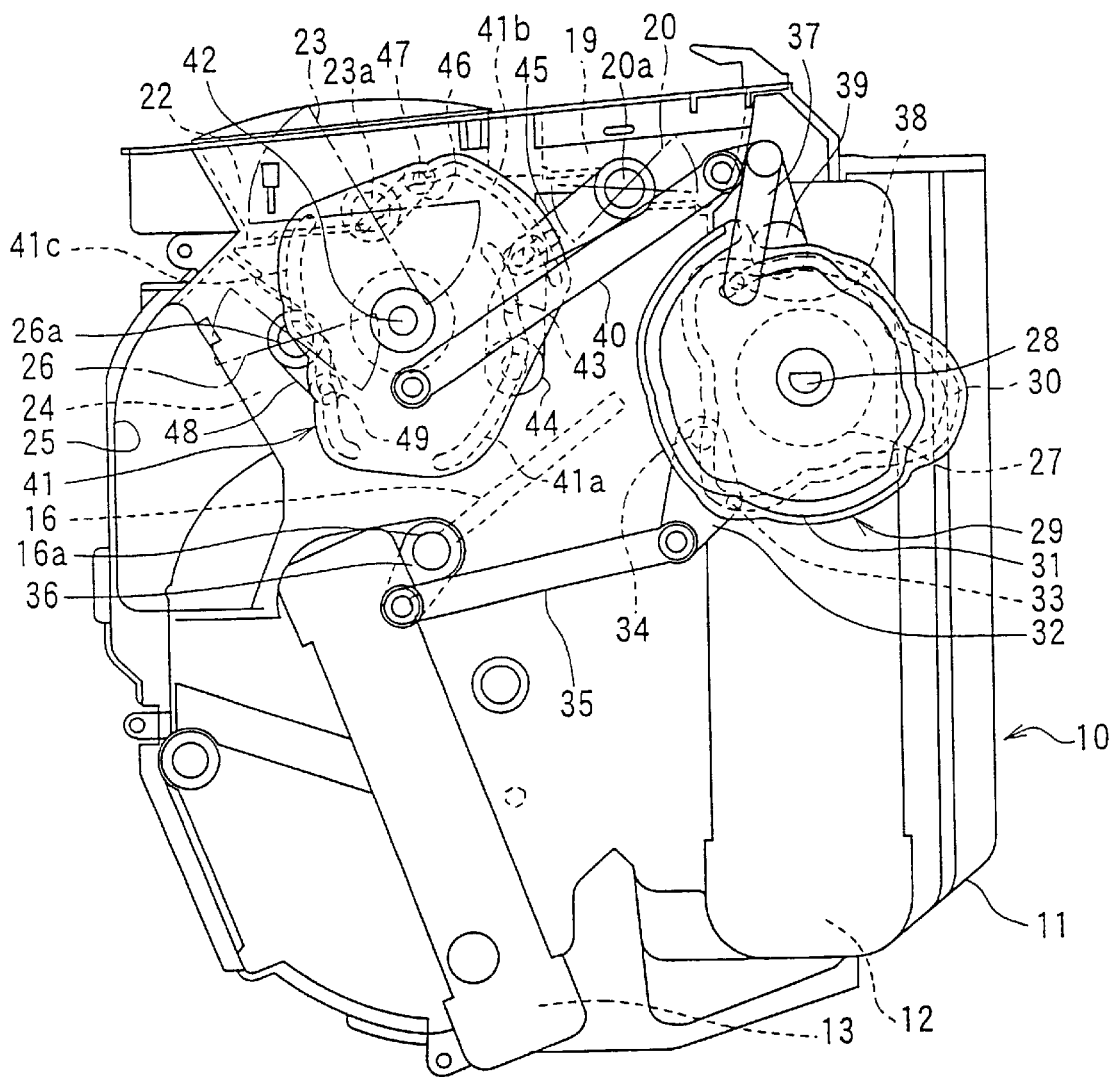
FIG. 3 is a schematic view showing a mounting state of the door driving system in an air conditioner unit of the vehicle air conditioner according to the first embodiment.
Figure 4A:
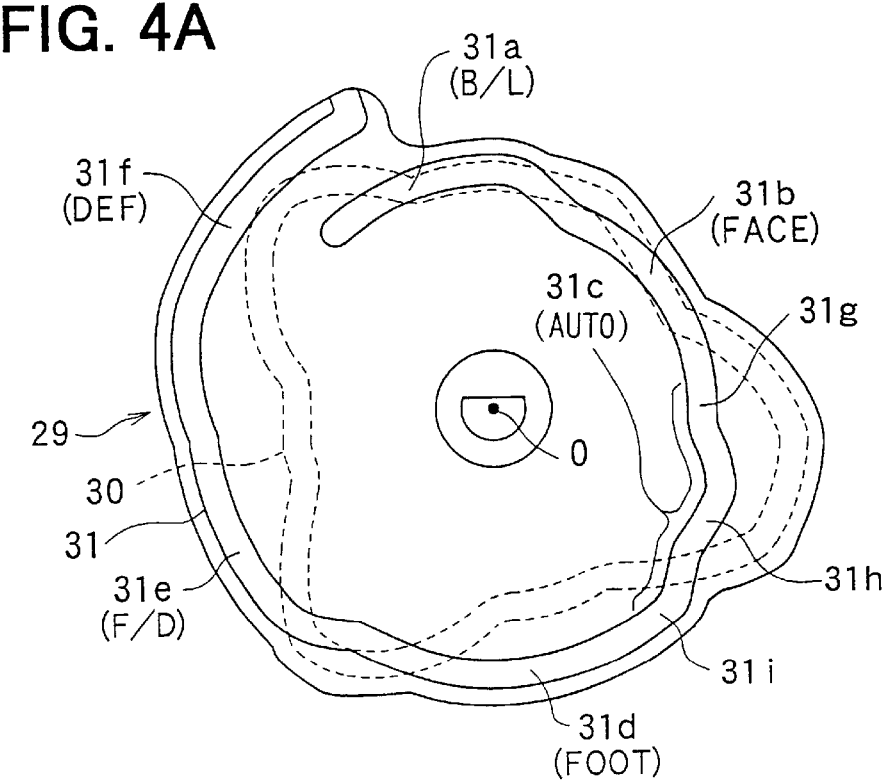
FIGS. 4A, 4B are views for explaining a distribution link of the door driving system according to the first embodiment.
Figure 4B:
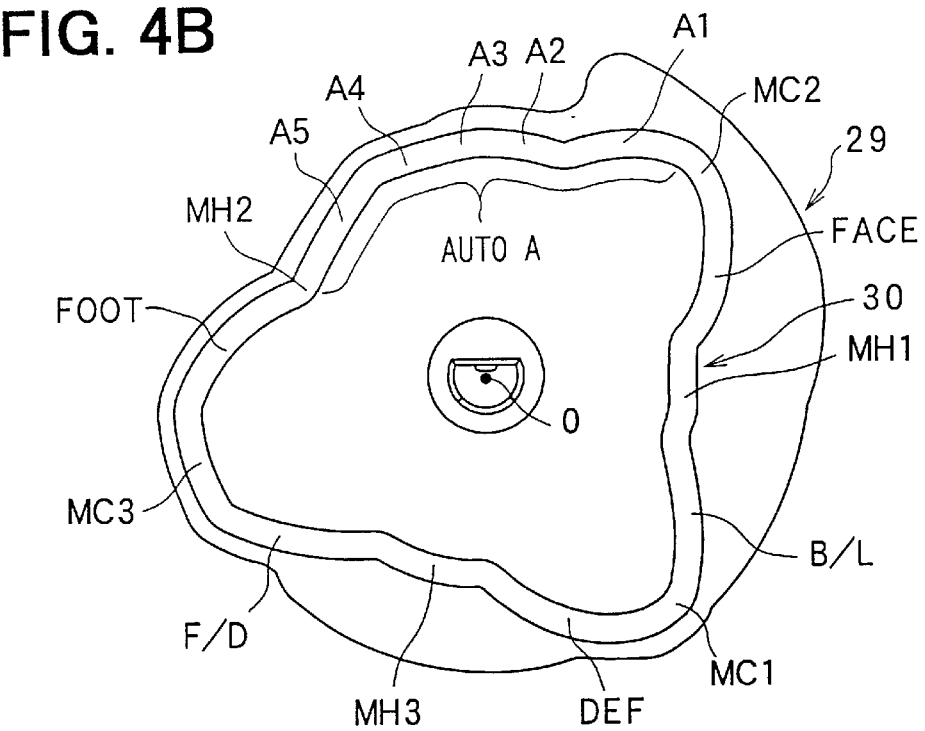

As shown in FIGS. 2 and 3, the actuator 27 made of a servomotor is disposed on an outside surface of the air conditioning case 11 at a predetermined position (e.g., driver-seat side), and an output shaft 28 of the actuator 27 is integrally connected to a distribution link 29. As shown in FIGS. 4A and 4B, the distribution link 29 has an approximate disk shape. One surface (back surface) of the distribution link 29 has a temperature-control engagement groove 30, and the other surface (front surface) of the distribution link 29 has a mode-switching engagement groove 31.

As shown in FIG. 4B, the temperature-control engagement groove 30 is one loop-shaped groove, and a pin 33 (see FIGS. 2, 3) integrally provided with a connection lever 32 is slidably fitted into the temperature-control engagement groove 30. The connection lever 32 is rotatably supported to the air conditioning case 11 by a rotation shaft 34, and is linked to an air-mixing door lever 36 through a connection rod 35.

The air-mixing door lever 36 is integrally connected to the rotation shaft 16a of the air mixing door 16 so as to be rotated together with the air mixing door 16. Accordingly, the pin 33 is displaced along the shape of the temperature-control engagement groove 30 due to rotation of the distribution link 29, so that the air mixing door 16 is rotated around the rotation shaft 16a through the connection lever 32, the connection rod 35 and the air mixing door lever 36.

The air mixing door 16 is rotated between a maximum cooling position (i.e., the position where an air passage of the heater core 13 is fully closed) indicated by the solid line in FIG. 1 and a maximum heating position (i.e., position where the cooling air bypass passage 15 is fully closed) indicated by the chain line in FIG. 1. An open degree of the air mixing door 16 is set at 0% in the maximum cooling position (lowest temperature position) and is set at 100% in the maximum heating position (highest temperature position).

As shown in FIG. 4A, the mode-switching engagement groove 31 is provided along a peripheral portion of the distribution link 29, and both ends of the mode-switching engagement groove 31 are displaced from each other in a radial direction of the distribution link 29. A pin 38 (see FIGS. 2, 3) integrally provided with a connection lever 37 is slidably fitted in the mode-switching engagement groove 31. The connection lever 37 is rotatably supported to the air conditioning case 11 through a rotation shaft 39, and is linked to a mode link 41 through a connection rod 40. The mode link 41 is rotatably supported to the air conditioning case 11 by a rotation shaft 42.

The mode link 41 is provided with a defroster engagement groove 41a, a face engagement groove 41b and a foot engagement groove 41c. A pin 43 is slidably fitted into the defroster engagement groove 41a, and an intermediate lever 44 is rotated in accordance with a displacement of the pin 43. A driving lever 45 of the defroster door 20 is rotated around the rotation shaft 20a of the defroster door 20 through the intermediate lever 44, so that the defroster door 20 can be rotated.

A pin 47 of a driving lever 46 of the face door 23 is slidably fitted into the face engagement groove 41b, and a pin 49 of a driving lever 49 of the foot door 26 is slidably fitted into the foot engagement groove 41c. The face door 23 and the foot door 26 can be rotated in accordance with displacement of the pins 47, 49 through the driving levers 46, 48, respectively.

Figure 5:
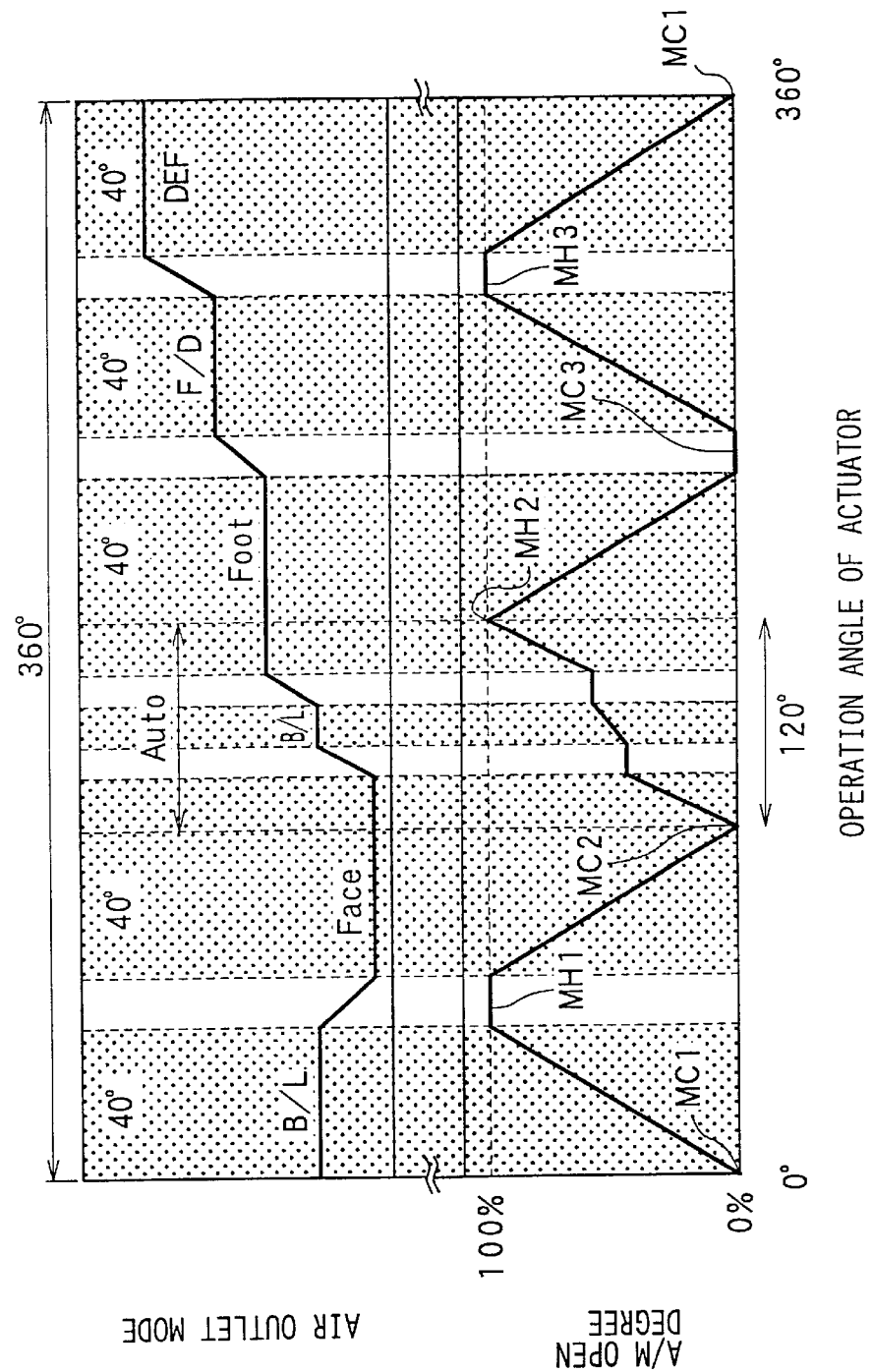
FIG. 5 is a view for explaining operation characteristics of the vehicle air conditioner according to the first embodiment.

FIG. 5 shows an open degree change of the air mixing door 16 and an air outlet mode change, relative to an operation angle change of the actuator (servomotor) 27. As shown in FIG. 5, a temperature control pattern, where an open degree of the air mixing door 16 is changed between 0% (maximum cooling position) and 100% (maximum heating position), is repeated six times when an operation angle of the actuator 27 changes by 360 degrees (one rotation).

In order to obtain the temperature control pattern shown in FIG. 5, the maximum cooling positions MC1, MC2, MC3 are set in this order in the temperature-control engagement groove 30 at three points in a rotational direction of the distribution link 29 as shown in FIG. 4B. Further, the maximum heating positions MH1, MH2, MH3 are set between the maximum cooling positions MC1, MC2, between the maximum cooling positions MC2, MC3 and between the maximum cooling positions MC1, MC3, respectively.

In the first embodiment, the maximum cooling positions MC1, MC2, MC3 are farthest from a rotation center O of the distribution link 29 in the temperature-control engagement groove 30. On the contrary, the maximum heating positions MH1, MH2, MH3 are closest to the rotation center O in the temperature-control engagement groove 30.

In FIG. 4B, an automatic range A, where the air outlet mode is automatically changed, is set between the maximum cooling position MC2 and the maximum heating position MH2. In the automatic range A of the temperature-control engagement groove 30, a face temperature-control groove A1, an idling groove A2, a bi-level temperature-control groove A3, an idling groove A4 and a foot temperature-control groove A5 are provided in this order in a direction from the maximum cooling position MC2 to the maximum heating position MH2.

Each of the idling grooves A2, A4 is provided in a circular arc shape, using the rotation center O of the distribution link 29 as a center, in a predetermined rotation angle range of the distribution link 29. In the rotation angle range of the idling grooves A2, A4, the air mixing door 16 is stopped, while the mode doors 20, 23, 26 are driven. Accordingly, the air mixing door 16 and the mode doors 20, 23, 26 are alternately driven in the automatic range A.

Each of the maximum cooling position MC3 and the maximum heating positions MH1, MH3 is also provided in a circular arc shape using the rotation center O of the distribution link 29 as a center, in a predetermined rotation angle range of the distribution link 29. In the rotation angle range of these grooves, the air mixing door 16 is stopped, while the mode doors 20, 23, 26 are driven. Accordingly, the air mixing door 16 and the mode doors 20, 23, 26 also can be alternately driven.

In FIG. 5, dotted areas indicate driving areas of the air mixing door 16 (i.e., stopping areas of the mode doors 20, 23, 26), and white areas indicate driving areas of the blow mode doors 20, 23, 26 (i.e., stopping areas of the air mixing door 16).

On the other hand, the mode-switching engagement groove 31 is set in accordance with a change of the temperature control pattern in the temperature-control engagement groove 30. Here, the pins 33, 38, fitted in the engagement grooves 30, 31, respectively, are disposed separately from each other by about 150 degrees with respect to the rotation center O of the distribution link 29. Therefore, the engagement grooves 30, 31 correspond to each other while they are offset from each other by about 150 degrees in the rotational direction of the distribution link 29.

In the mode-switching engagement groove 31, specifically, a bi-level groove 31a is set so as to correspond to a range between the maximum cooling position MC1 and the maximum heating position MH1 in the temperature-control engagement groove 30, a face groove 31b is set so as to correspond to a range between the maximum heating position MH1 and the maximum cooling position MC2 in the temperature-control engagement groove 30, and an automatic setting groove 31c is set so as to correspond to a range between the maximum cooling position MC2 and the maximum heating position MH2 in the temperature-control engagement groove 30.

In the mode-switching engagement groove 31, further, a foot groove 31d is set so as to correspond to a range between the maximum heating position MH2 and the maximum cooling position MC3 in the temperature-control engagement groove 30, a foot/defroster groove 31e is set so as to correspond to a range between the maximum cooling position MC3 and the maximum heating position MH3 in the temperature-control engagement groove 30, and a defroster groove 31f is set so as to correspond to a range between the maximum heating position MH3 and the maximum cooling position MC1 in the temperature-control engagement groove 30.

In the automatic setting groove 31c, an automatic area face groove 31g is provided next to the face groove 31b, an automatic area foot groove 31i is provided next to the foot groove 31d, and an automatic area bi-level groove 31h is provided between these automatic area grooves 31g, 31i.

In the mode-switching engagement groove 31, each of the grooves 31a–31i is provided in a circular arc shape in which the rotation center O of the distribution link 29 is used as a center. Therefore, the pin 38 is not displaced when being positioned in each range of the grooves 31a–31i. Accordingly, since the mode link 41 is not rotated in each range of the grooves 31a–31i, a predetermined air outlet mode can be maintained and fixed. Driving grooves where the pin 38 is displaced are provided between two adjacent grooves of grooves 31a–31i, respectively, and the mode link 41 is rotated using displacement of the pin 38, thereby switching the air outlet mode.

As illustrated in FIG. 5, in an entire operation angle range of 360 degrees of the actuator 27 (distribution link 29), an operation angle range for each air outlet mode set manually is 40 degrees, and the sum of the operation angle ranges for all the manually set air outlet modes is 200 degrees. An operation angle range for all air outlet modes set automatically is 120 degrees, and a residual range of 40 degrees is an operation angle range for switching between air outlet modes set manually.

Figure 6:
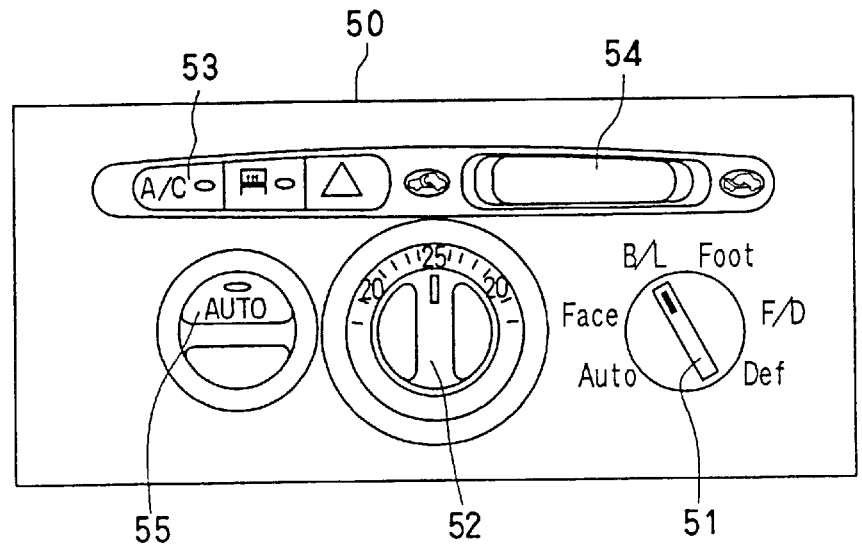
FIG. 6 is a front view showing an example of an air-conditioning operation panel used in the first embodiment.

An air-conditioning operation panel 50 shown in FIG. 6 includes a mode knob 51 which is a rotary mode-setting operation member. The mode knob 51 can be rotated to a face (FACE) mode position, a bi-level (B/L) mode position, a foot (FOOT) mode position, a foot/defroster (F/D) mode position and a defroster (DEF) mode position other than an automatic (AUTO) mode position where the air outlet mode is automatically switched in accordance with an opening degree change of the air mixing door 16.

Further, the air-conditioning panel 50 includes a temperature setting member 52 with a rotary knob, a push-button air-conditioning switch 53, a push-button inside/outside switch 54, a blower switch 55 with a rotary knob and the like in addition to the mode knob 51. As well known, the temperature setting member 52, the air-conditioning switch 53, the inside/outside air switch 54 and the blower switch 55 generate a temperature setting signal, an interrupting signal for an air-conditioning compressor, an inside/outside air switching signal and an air amount switching signal, respectively.

Figure 7:
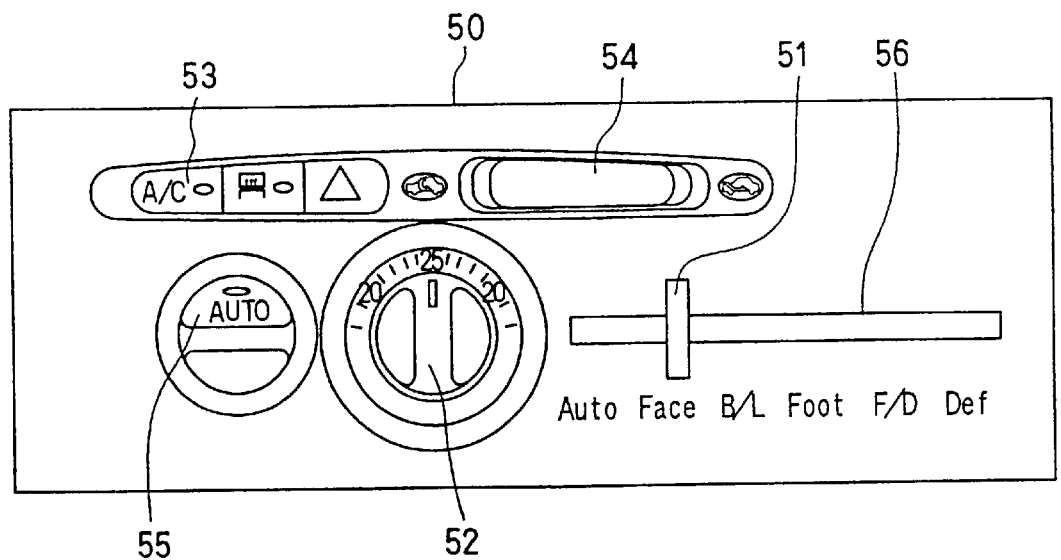
FIG. 7 is a front view showing another example of the air-conditioning operation panel used in the first embodiment.

As shown in FIG. 7, without limited to a rotary operation member, the mode knob 51 can be a lever-shaped operation member which is slidably operated through a guide slot 56.

Figure 8:
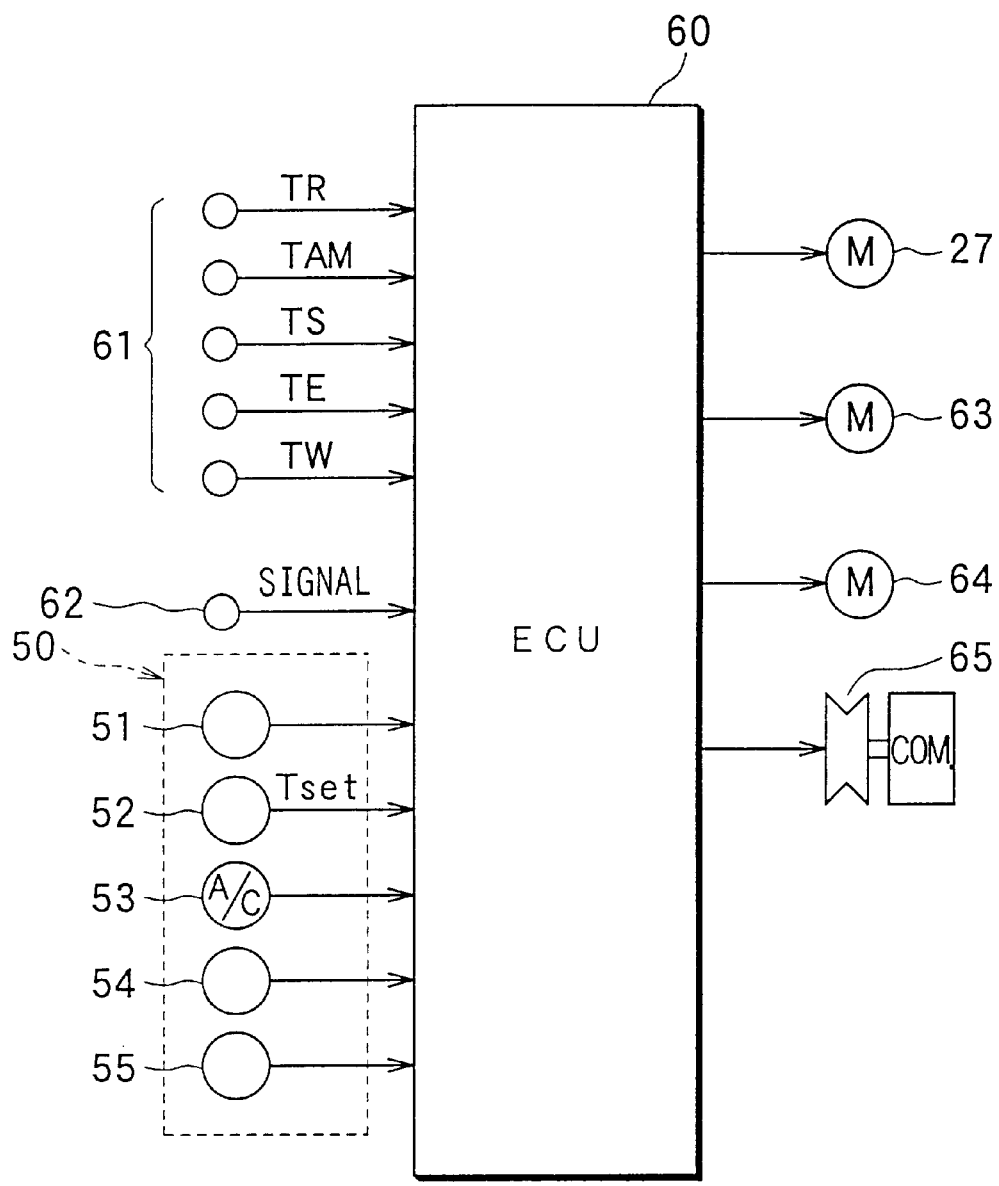
FIG. 8 is a block diagram showing electric control of an electronic control unit (ECU) according to the first embodiment.

Next, control operation of an electronic control unit (ECU) according to the first embodiment will be now described with reference to FIGS. 8 and 9. Detection signals are inputted into the electronic control unit (ECU) 60 from a sensor group 61 for detecting an inside air temperature TR, an outside air temperature TAM, a solar radiation amount TS, an air temperature of an evaporator (evaporator cooling degree) TE, a hot water temperature TW and the like.

Further, operation signals such as an operation position signal of the mode knob 51, a set temperature signal from the temperature setting member 52, an interrupting signal (ON/OFF signal) for a compressor of an air-conditioning refrigerant cycle from the air-conditioning switch 53, an inside/outside air switching signal from the inside/outside switch 54 and an air amount switching signal from the blower switch 55 are inputted into the ECU 60. In addition, an operation angle signal is inputted into the ECU 60 from a rotational position sensor (potentiometer) 62 of the actuator 27.

The ECU 60 is composed of a well-known microcomputer, which includes a central processing unit (CPU), a read only memory (ROM), a random access memory (RAM), its peripheral circuits and the like. The ECU 60 performs a predetermined calculation based on a preset program, thereby controlling energization for the actuator 27, the inside/outside switching door, a driving actuator (servomotor) 63, a blower motor 64, a solenoid clutch 65 for interrupting operation of the compressor and the like.

Figure 9:
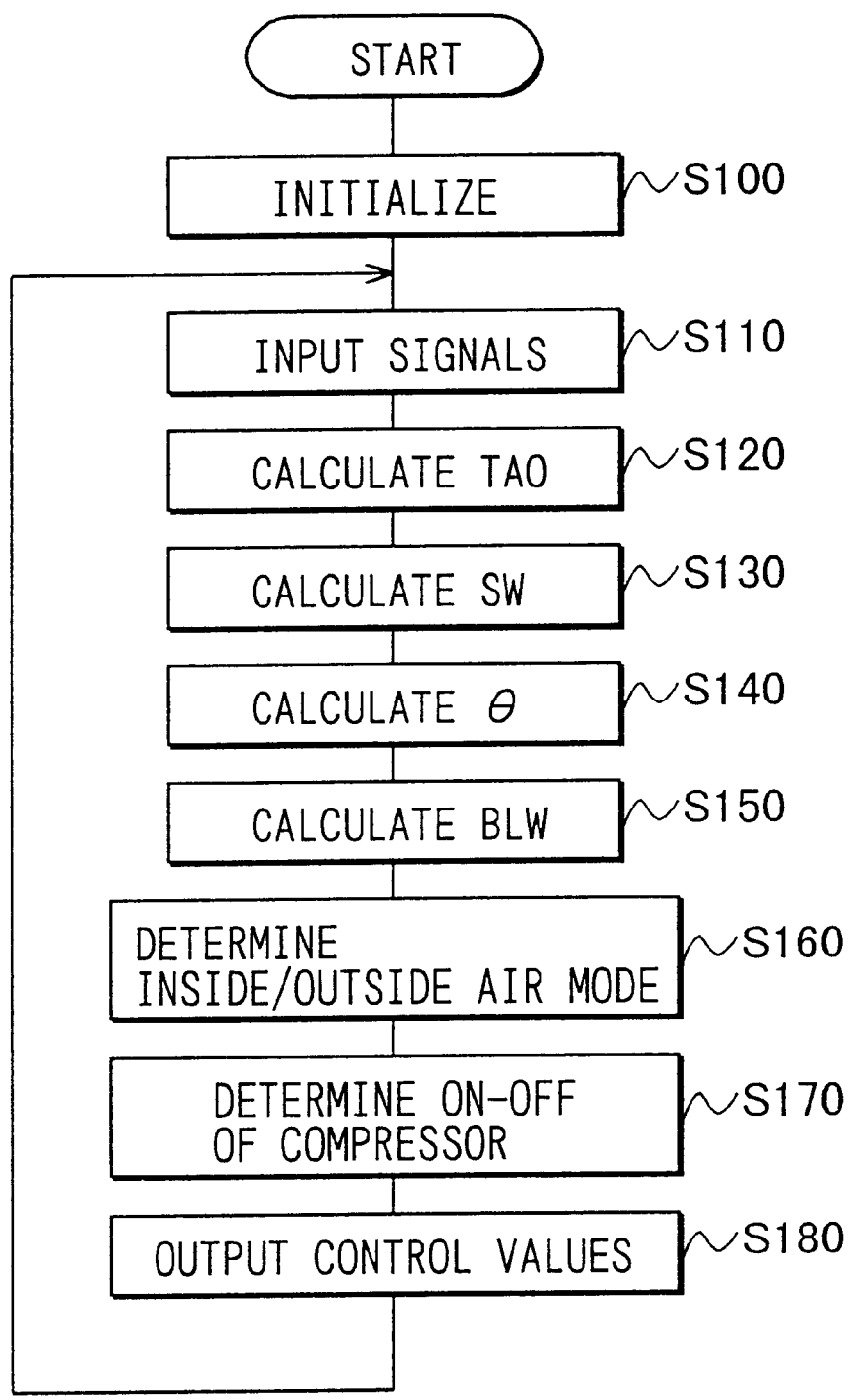
FIG. 9 is a flow diagram showing control operation of the electronic control unit (ECU) according to the first embodiment.

The flow diagram shown in FIG. 9 is an outline of a control operation executed by the microcomputer of the ECU 60. When the blower switch 55 of the air-conditioning operation panel 50 is turned on in a state where an ignition switch of the vehicle engine is turned on and the ECU 60 is energized, a control routine shown in FIG. 9 is started.

At step S100, a flag, a timer and the like are initialized. At step S110, detection signals from the sensor group 61, operation signals from the air-conditioning operation panel 50 and the like are read.

Next, at step S120, a target blow temperature (TAO) of conditioned air to be blown into a passenger compartment is calculated based on the following formula (1). The target blow temperature (TAO) is an air temperature required for maintaining the passenger compartment at a set temperature Tset of the temperature setting member 52.

$$TAO = Kset \times Tset - Kr \times TR - Kam \times TAM - Ks \times TS + C \quad (1)$$

wherein: TR indicates an inside air temperature, TAM indicates an outside air temperature, TS indicates a solar radiation amount, Tset indicates a set temperature, each of Kset, Kr, Kam and Ks indicate a control gain, and C indicates a correction constant.

At step S130, a target open degree SW of the air mixing door 16 is calculated by the following formula (2).

$$SW = [(TAO - TE)/(TW - TE)] \times 100 (\%) \quad (2)$$

In the formula (2), the target open degree SW is calculated as percentage, when the maximum cooling position where the air passage to the heater core 13 is entirely closed is defined as 0% and the maximum heating position where the cooling air bypass passage 15 is entirely closed is defined as 100%.

At step S140, a target operation angle θ of the actuator 27 is calculated. The characteristics of the air mixing door 16 shown in FIG. 5 at the lower side are beforehand stored in the ROM as a map, and the target operation angle θ is calculated using the target open degree SW and the operation position signal from the mode knob 51. That is, the target operation angle θ of the actuator 27 in an abscissa in FIG. 5 can be determined based on an air outlet mode selected by a passenger using the blow mode knob 51 among six mode regions including the automatic mode region, and the calculated target open angle SW of the air mixing door 16.

At step S150, a target air amount BLW blown by the blower fan of the blower unit is calculated using the target blow temperature TAO. As well known, the target air amount BLW is calculated so as to be larger at a high temperature side (maximum heating side) of the target blow temperature TAO and a low temperature side (maximum cooling side) thereof and so as to be smaller at an intermediate temperature region of the target blow temperature TAO.

At step S160, the inside/outside air mode is determined in accordance with the target blow temperature TAO. As well known, as the target blow temperature TAO increases from a low temperature side to a high temperature side, the inside/outside air mode is set so as to be switched from an inside air mode to an outside air mode or so as to be switched from an entire inside air mode to an entire outside air mode through an inside/outside mixing mode.

At step S170, it is determined whether the operation of the compressor is turned on or turned off. Specifically, a target evaporator air temperature TEO is calculated using the target blow temperature TAO and the outside air temperature TAM. When an evaporator air temperature TE is larger than the target evaporator air temperature TEO (TE>TEO), the compressor is turned on. When the evaporator air temperature TE is equal to or lower than the target evaporator air temperature TEO (TE≦TEO), the compressor is turned off.

At step S180, control values, calculated at the steps S140–S170, are output to the actuators 27, 63, the blower motor 64 and the solenoid clutch 65, respectively, thereby controlling air-conditioning operation of the vehicle air conditioner.

That is, the actuator 27 is controlled so that an actual operation angle of the actuator 27 detected by the position detection sensor 62 becomes equal to the target operation angle θ calculated at the step S140. More specifically, when the actual operation angle is not equal to the target operation angle θ, the actuator 27 is energized and is operated by the ECU 60.

The actuator 27 can be rotated clockwise and counterclockwise by reversing a voltage applied to the actuator 27. When the actual operation angle becomes equal to the target operation angle θ due to operation of the actuator 27, a power supply to the actuator 27 is stopped by the ECU 60, and the operation of the actuator 27 is stopped.

A revolution speed of the blow motor 64 is controlled by controlling a voltage applied thereto so that the target air amount BLW can be obtained. The driving actuator 63 controls an operation position of an inside/outside door (not shown) so that an inside/outside air mode determined at the step S160 can be obtained. The solenoid clutch 65 performs on-off operation control of the compressor so that the actual evaporator air temperature TE becomes equal to the target evaporator air temperature TEO.

According to the first embodiment of the present invention, the air mixing door 16 and the mode doors 20, 23, 26 are driven by the one actuator 27, the number of actuators used in the vehicle air conditioner is reduced and an electrical circuit structure of the ECU 60 is simplified due to its reduction, thereby largely reducing production cost.

If a temperature control due to the air mixing door 16 and a mode switching control due to the mode doors 20, 23, 26 are simply performed by using one actuator for reducing the number of actuators, correspondence relation may be always fixed between each operation position of the air mixing door 16 and each switched air outlet mode. Therefore, a temperature control range in each air outlet mode may be always fixed to a predetermined temperature range, and the temperature of air blown into the passenger compartment cannot be changed to a low temperature or a high temperature. On the other hand, a defroster mode, which is required to set irrespective of the operation position of air mixing door 16 when a windshield is fogged, cannot be set at any time.

However, according to the first embodiment of the present invention, through the distribution link 29 with the temperature-control engagement groove 30 and the mode-switching engagement groove 31, the air mixing door 16 and the mode doors 20, 23, 26 are operated by the one actuator. Accordingly, as shown in FIG. 5, by selecting the operation position of the mode knob 51, the air outlet mode can be manually and freely set among the face mode, the bi-level mode, the foot mode, the foot/defroster mode and the defroster mode in accordance with a request of the passenger. In addition, when the air outlet mode is manually set, the temperature setting member 52 is set at a set temperature Tset and the target operation angle θ is changed based on the set temperature Tset, so that the open degree of the air mixing door 16 can be changed between the maximum cooling position (open degree is 0%) and the maximum heating position (open degree is 100%). Accordingly, the air temperature blown into the passenger compartment can be controlled in an entire controllable range by the air mixing door 16 in any one air outlet mode.

Further, when the mode knob 51 is switched to the automatic mode position, the target operation angle θ is positioned between the maximum cooling position MC2 and the maximum heating position MH2, and the air outlet mode can be automatically selected among the face mode, the bi-level mode and the foot mode in accordance with the open degree change of the air mixing door 16. Accordingly, the passenger does not need to manually set the air outlet mode, thereby reducing an operation burden for the passenger. Further, the foot/defroster mode and the defroster mode can be set irrespective of the open degree of the air mixing door 16 to defrost the windshield. That is, the foot/defroster mode and the defroster mode are not automatically set in accordance with the open degree change of the air mixing door 16.

As shown in FIG. 5, the automatic mode, where the air outlet mode is automatically switched in accordance with the open degree change of the air mixing door 16, is set in an intermediate range among plural manual air outlet modes, thereby reducing an operation angle of the actuator 27 required for switching the air mode from the automatic mode to any one of the plural manual modes.

In a case where the automatic mode is set at the most right or left end in FIG. 5 at an upper side, when the blow mode is switched from the automatic mode to a manual mode set at an opposite end of the automatic mode, the operation angle of the actuator 27 is required to be a large angle of about 360 degrees, thereby increasing a mode-switching time. During this mode switching operation, the open degree of the air mixing door 16 increases and decreases by plural times in accordance with the operation angle change of the actuator 27 in the open-degree change characteristics of the air mixing door 16 shown in FIG. 5 at the lower side. Therefore, the temperature of air blown into the passenger compartment increases and decreases by plural times, thereby giving unusual feeling to the passenger.

According to the first embodiment of the present invention, the automatic mode is set in the intermediate range among the plural manual modes. Therefore, the above trouble can be restricted as little as possible.

An open-degree change range of the air mixing door 16 (dotted areas of operation characteristics in FIG. 5) and a mode-switching range (white areas of operation characteristics in FIG. 5) are alternately set with respect to the operation angle change of the actuator 27, so that the air mixing door 16 and the blow mode doors 20, 23, 26 are alternately driven by the actuator 27. Therefore, driving torque of the actuator 27 can be reduced, the actuator 27 can be miniaturized in low cost.

A second preferred embodiment of the present invention will be now described with reference to FIGS. 10–13. In the above-described first embodiment, the front and back surfaces of the distribution link 29, rotated by the actuator 27, are provided with the mode-switching engagement groove 31 and the temperature-control engagement groove 30, respectively, as the driving system for driving the air mixing door 16 and the blow mode doors 20, 23, 26. However, in the second embodiment of the present invention, two links are provided in place of the distribution link 29.

Figure 10:
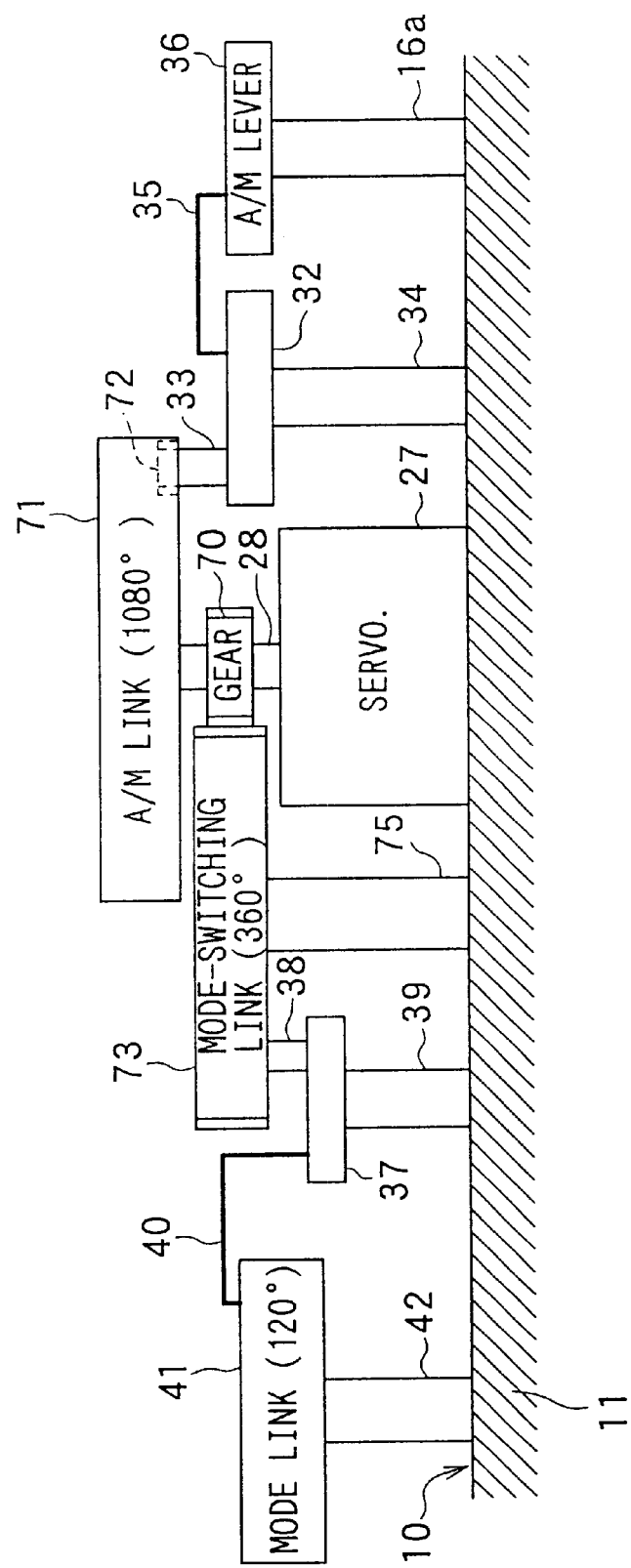
FIG. 10 is a schematic view showing a link mechanism of a door driving system used for a vehicle air conditioner according to a second preferred embodiment of the present invention.

In the second embodiment, as shown in FIG. 10, a temperature control link (air-mixing (A/M) link) 71 and a speed reducing gear 70 are integrated to an output shaft 28 of the actuator 27 constructed by a servomotor.

In the second embodiment, the temperature control link 71 has an approximate disk shape, and its back surface has a temperature-control engagement groove 72 having a loop shape. Similarly to the first embodiment, the pin 33, integrated with the connection lever 32, is slidably fitted in the temperature-control engagement groove 72. Accordingly, the air mixing door 16 is rotated around the rotation shaft 16a by displacement of the pin 33 through the connection lever 32, the connection rod 35 and the air-mixing door lever 36.

Figure 11:
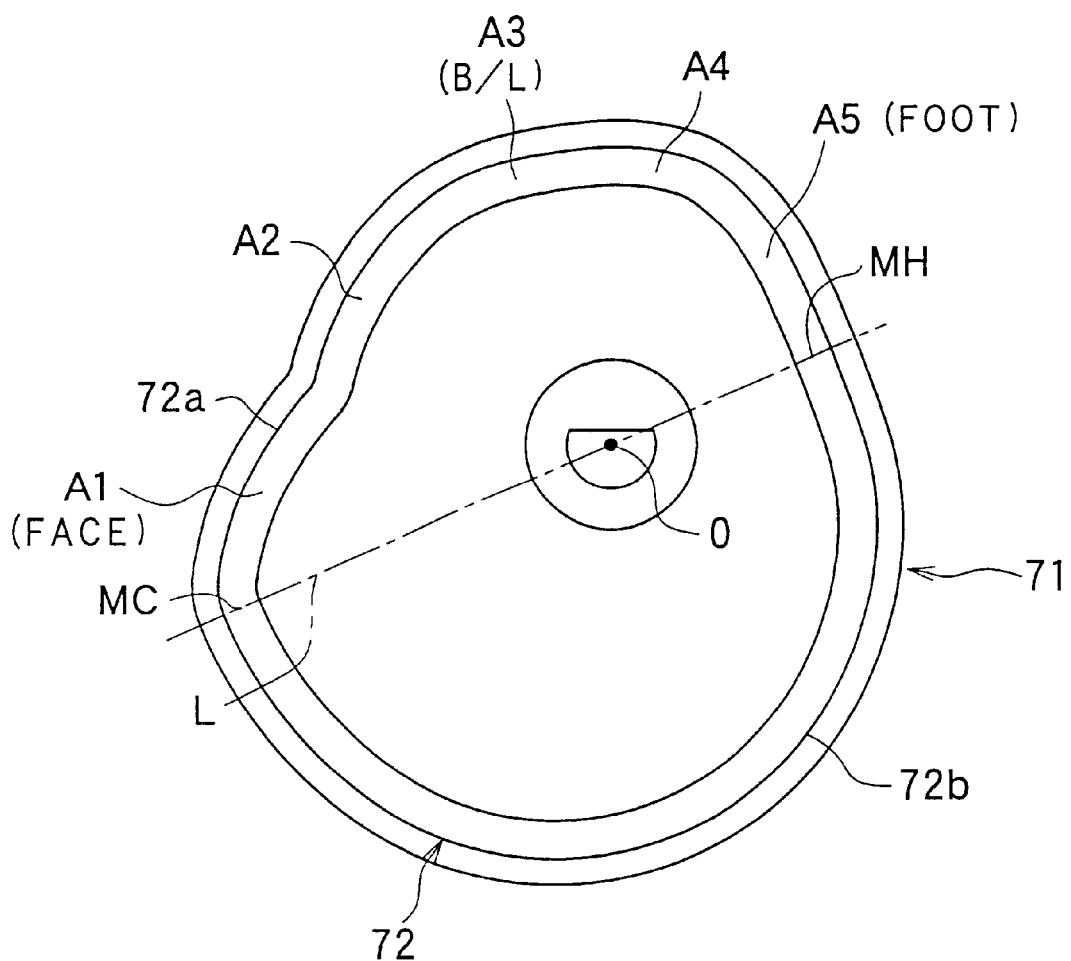
FIG. 11 is a front view showing a temperature control link of the door driving system according to the second embodiment.

As shown in FIG. 11, two engagement grooves 72a, 72b, which have different groove shapes, respectively, are provided in the temperature-control engagement groove 72 having the loop shape. The two engagement grooves 72a, 72b are provided at both sides each of which have a range of 180 degrees, respectively, with respect to a center line L passing through a rotation center O of the temperature control link 71.

In the first embodiment, the maximum cooling position MC is set in the temperature-control engagement groove 72 (engagement grooves 72a, 72b) at one side in the center line L, and the maximum heating position MH is set in the temperature-control engagement groove 72 at the other side in the center line L. The maximum cooling position MC is a position furthest from the rotation center O of the temperature control link 71 in the temperature-control engagement groove 72. On the contrary, the maximum heating position MH is a position nearest from the rotation center O in the temperature-control engagement groove 72. These positions are also indicated at their correspondence positions, respectively, in FIG. 12.

In FIG. 11, the engagement groove 72a at an upper side of the center line L corresponds to the automatic range A of the temperature-control engagement groove 30 in the first embodiment. In the engagement groove 72a, the face temperature control groove A1, the idling groove A2, the bi-level temperature control groove A3, the idling groove A4 and the foot temperature control groove A5 are provided in this order from the side of the maximum cooling position MC to the side of the maximum heating position MH.

Each of the idling grooves A2, A4 is formed into a circular arc shape using the rotation center O of the temperature control link 71 as a center, in a predetermined rotation angle range of the temperature control link 71. Therefore, when the temperature-control engagement groove 72 is rotated in the rotation angle range of the idling grooves A2, A4, the pin 33 is maintained at a predetermined position, so that the air mixing door 16 is stopped. While the air mixing door 16 is stopped, the mode doors 20, 23, 26 are driven, so that the air mixing door 16 and the mode doors 20, 23, 26 are alternately driven in the automatic range A of the engagement groove 72a.

In the engagement groove 72b, the open degree of the air mixing door 16 is changed in accordance with the operation angle change of the temperature control link 71 in a range of 180 degrees. A radial dimension of the link groove 72b from the rotation center O is continuously increased from the side of the maximum heating position MH to the side of the maximum cooling position MC, and therefore, idling grooves are not provided in the engagement groove 72b.

Figure 12:
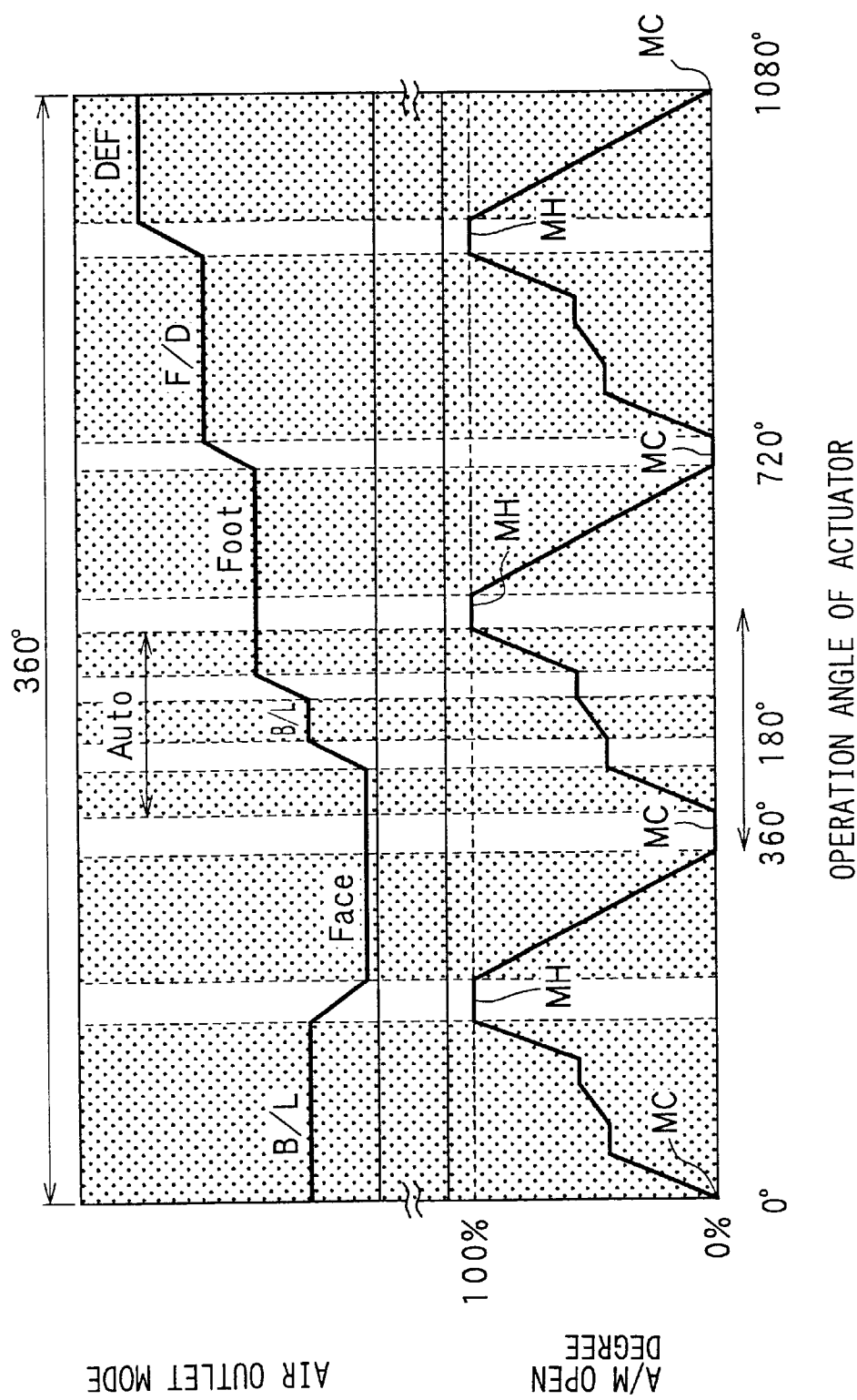
FIG. 12 is a view for explaining operation characteristics of the vehicle air conditioner according to the second embodiment.

In the temperature control patterns shown in FIG. 12 at the lower side, a temperature control pattern, where the open degree of the air mixing door 16 is increased from the maximum cooling position MC to the maximum heating position MH in accordance with the operation angle increase of the actuator 27, is set by the engagement groove 72a. Further, a temperature control pattern, where the open degree of the air mixing door 16 is decreased from the maximum heating position MH to the maximum cooling position MC in accordance with the operation angle increase of the actuator 27, is set by the engagement groove 72b.

Figure 13:
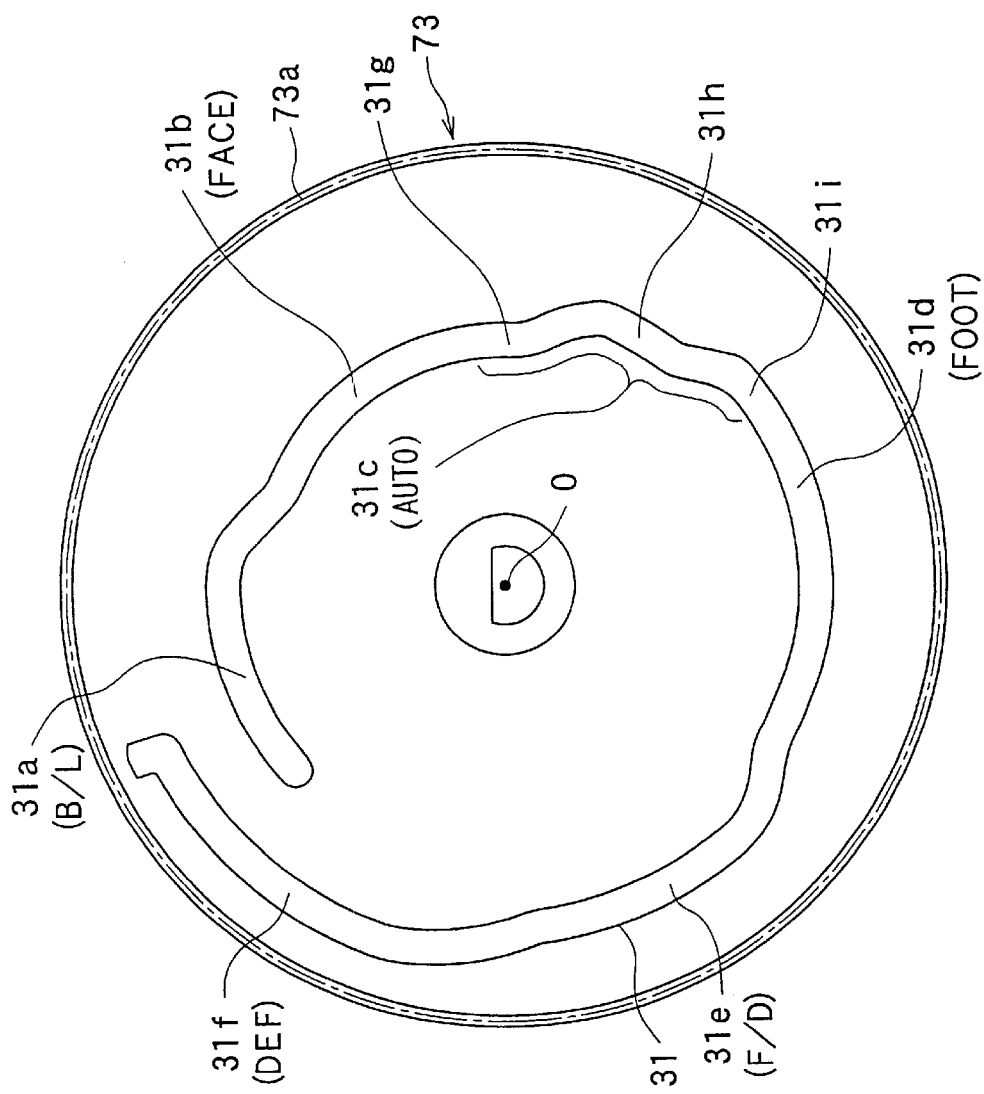
FIG. 13 is a front view showing a mode switching link of the door driving system according to the second embodiment.

A mode switching link 73 is connected to the speed reducing gear 70 of the output shaft 28 of the actuator 27. In the second embodiment, as shown in FIG. 13, a gear portion 73a meshed to the speed reducing gear 70 is provided directly on a peripheral surface of the mode switching link 73. Since a diameter of the gear portion 73a is greatly larger than a diameter of the speed reducing gear 70, rotation of the actuator 27 is transmitted to the mode switching link 73 while the rotation speed of the actuator 27 is reduced.

Specifically, the operation angle of 1080 degrees (three rotations) of the actuator 27 (temperature control link 71) corresponds to an operation angle of 360 degrees (one rotation) of the mode switching link 73. Through such a speed reducing mechanism, the operation angle of the mode switching link 73 can be reduced to a required angle.

The mode switching link 73 is rotatably supported to the air conditioning case 11 through a rotation shaft 75. As shown in FIG. 13, the mode-switching engagement groove 31 is provided in the mode switching link 73 in the same shape as that in the first embodiment. The automatic setting groove 31c is set in the mode-switching engagement groove 31 at an intermediate portion. The bi-level groove 31a and the face groove 31b are set in the mode-switching engagement groove 31 at one side of the automatic setting groove 31c. The foot groove 31d, the foot/defroster groove 31e and the defroster groove 31f are set in the mode-switching engagement groove 31 at the other side of the automatic setting groove 31c. In the automatic setting groove 31c, an automatic setting face groove 31g, an automatic setting bi-level groove 31h and an automatic setting foot groove 31i are provided.

Similarly to the first embodiment, the pin 38 of the connection lever 37 is slidably fitted in the mode switching groove 31, and the connection lever 37 is linked to the mode link 41 through the connection rod 40. The mode doors 20, 23, 26 are opened and closed due to rotation of the mode link 41. Since those parts can be basically identical to those in the first embodiment, detail description is omitted.

In the mode-switching engagement groove 31, each of the grooves 31a–31i is provided in a circular arc shape using the rotation center O of the mode-switching link 73 as a center. Therefore, when the pin 38 is positioned within each range of the grooves 31a–31i, the pin 38 is not displaced. Because the mode link 41 is not rotated while the pin 38 is positioned in each range of the grooves 31a–31i, a predetermined air outlet mode is maintained and fixed. Driving grooves where the pin 38 is displaced are provided between the grooves 31a–31i adjacent to each other, respectively, and the mode link 41 is rotated using displacement of the pin 38 in the driving grooves, thereby switching an air outlet mode.

According to the second embodiment of the present invention, the temperature control link 71 is directly connected to the output shaft 28 of the actuator 27, and the mode switching link 73 is connected to the output shaft 28 of the actuator 27 through the gear 70. In addition, the rotation of the actuator 27 is transmitted to the mode switching link 73 while the rotation thereof is reduced (reduced to ⅓ of the rotation in the second embodiment) Therefore, as shown in FIG. 12, the mode switching link 73 is rotated by one rotation (360 degrees) while the actuator 27 (temperature control link 71) is rotated by three rotations (1080 degrees), and the same operation characteristics (temperature control and mode switching characteristics) as in the FIG. 5 in the first embodiment can be obtained.

In the second embodiment, the plural rotation of the temperature control link 71 is performed while the mode switching link 73 is rotated by one rotation. Therefore, as shown in FIG. 11, an angle range of 180 degrees can be provided between the maximum cooling position MC and the maximum heating position MH in the temperature-control engagement groove 72. Accordingly, a ratio of the open degree of the air mixing door 16 to the operation angle of the actuator 27 (open angle of the air mixing door 16/the operation angle of the actuator 27) can be reduced, thereby improving temperature-control distribution performance due to the operation angle of the actuator 27.

In the above-described first embodiment, as shown in FIG. 5, six temperature patterns are set in the entire operation-angle range (360 degrees) of the actuator 27. For example, when the automatic range is set in an operation angle of 120 degrees, each of the other five mode ranges is a small operation angle of about 40 degrees. As a result, a ratio of the open degree of the air mixing door 16 to the operation angle of the actuator 27 (open angle of the air mixing door 16/the operation angle of the actuator 27) can be increased, thereby reducing temperature-control distribution performance of the operation angle of the actuator 27. According to the second embodiment, however, temperature-control distribution performance can be improved, thereby improving temperature control performance in the vehicle air conditioner.

In the second embodiment, since the operation angle of the actuator 27 (temperature control link 71) during one rotation of the mode switching link 73 is increased from 360 degrees to 1080 degrees, a mode switching time is increased more than in the first embodiment. However, in the second embodiments, the other effects described in the first embodiment can be obtained.

Although the present invention has been fully described in connection with the preferred embodiments thereof with reference to the accompanying drawings, it is to be noted that various changes and modifications will become apparent to those skilled in the art.

For example, in the above-described embodiments, the air mixing door 16, for adjusting a mixing ratio between cool air passing through the cool air bypass passage 15 and warm air passing through the heater core 13, is used as a temperature control unit for controlling the temperature of air blown into the passenger compartment. However, a hot water valve, for adjusting an amount of hot water passing through the heater core 13, or the like can be used as the temperature control unit.

In the above-described embodiments, three plate-like doors 20, 23, 26 are used as the mode doors. When a rotary door having a half circular tube shape, a flexible resin film door or the like is used as the mode doors, the mode doors can be formed by an integrated single door member.

Such changes and modifications are to be understood as being within the scope of the present invention as defined by the appended claims.

What is claimed is:

1. An air conditioner for a vehicle having a passenger compartment, the air conditioner comprising:

an air conditioning case defining an air passage through which air flows, the air conditioning case having a plurality of openings from which air in the air passage is blown toward plural positions of the passenger compartment;

a temperature control unit attached to the case for controlling a temperature of air blown into the passenger compartment;

a mode switching member attached to the case for opening and closing the openings to selectively switch to one air outlet mode from among a plurality of air outlet modes;

a single actuator for driving both the temperature control unit and the mode switching member; and a link member attached to the actuator, the temperature control unit and the mode switching member through which the temperature control unit and the mode switching member are driven by the actuator, wherein:

temperature control unit is operable by a plurality of temperature control patterns in accordance with an operation angle of the actuator;

when the actuator is operated in a first predetermined angle in a first temperature control pattern, the temperature control unit is changed from a lowest temperature position to a highest temperature position, and the mode switching member is fixed at a predetermined mode position; and when the actuator is operated in a second predetermined angle in a second temperature control pattern, the temperature control unit is changed from the highest temperature position to the lowest temperature position, and the mode switching member is fixed at a mode position different from the predetermined mode position.

2. The air conditioner according to claim 1, wherein:
the link member includes a predetermined stopping area between adjacent temperature control patterns; and wherein:
the temperature control unit is fixed when the actuator operates in the predetermined stopping area, and the mode switching member is operable to perform a mode switch operation when the actuator operates in the predetermined stopping area.

3. The air conditioner according to claim 2, wherein the predetermined stopping area and the temperature control pattern are alternately set in an automatic control.

4. The air conditioner according to claim 1, wherein:
when the temperature control unit is changed between the lowest temperature position and the highest temperature position in one of the temperature control patterns, the mode switching door is operable to automatically switch between the air outlet modes in a predetermined automatic control pattern;

temperature control unit is changed between the lowest temperature position and the highest temperature position in each of the other temperature control patterns, the mode switching member is operable to set one air outlet mode; and the air outlet mode set in each of the other temperature control patterns, is different from each other.

5. The air conditioner according to claim 4, wherein:
the link member includes a first stopping area between adjacent temperature control patterns, and a second stopping area within the one of the temperature control patterns;
the temperature control unit is fixed when the actuator operates in the first stopping area, and the mode switching member is operable to perform a mode switch operation when the actuator operates in the first stopping area; and the temperature control unit is fixed when the actuator operates in the second stopping area, and the mode switching member is operable to Perform the mode switch operation when the actuator operates in the second stopping area.

6. The air conditioner according to claim 4, wherein:
the openings includes a face opening through which air is blown toward a head side of a passenger in the passenger compartment, a foot opening through which air is blown toward a foot side of the passenger, and a defroster opening through which air is blown to a windshield of the vehicle;

the mode switching member automatically switches between a face mode where air is blown from the face opening, a bi-level mode where air is blown from the face opening and the foot opening, and a foot mode where air is blown from the foot opening, in the one of the temperature control patterns; and the mode switching member switches to one of a defroster mode where air is blown from the defroster opening, the face mode, the bi-level mode and the foot mode, in each of the other temperature control patterns.

7. The air conditioner according to claim 1, wherein:
the link member includes a distribution link rotated by the actuator;

a first surface of the distribution link defines a temperature-control engagement groove through which the temperature control unit is changed based on the temperature control patterns; and a second surface of the distribution link defines a mode-switching engagement groove through which the mode switching member is operated to a position corresponding to the predetermined air outlet mode.

8. The air conditioner according to claim 7, wherein:
the mode switching engagement groove has an automatic setting groove for automatically switching between the air outlet modes using the mode switching member, and a manual setting groove for manually switching between the air outlet modes using the mode switching member;

the mode switching member is operable to automatically switch between the air outlet modes through the automatic setting groove in accordance with a change in the temperature control unit in a first operation range of the distribution link; and the mode switching member is fixed at one air outlet mode through the manual setting groove irrespective of the change in the temperature control unit in a second operation range different from the first operation range of the distribution link.

9. The air conditioner according to claim 8, wherein the automatic setting groove is provided in an intermediate position of the manual setting groove.

10. The air conditioner according to claim 1, wherein:
the link member includes
a first position adjusting mechanism for adjusting of the temperature control unit in accordance with a rotational position of the actuator, and
a second position adjusting mechanism for adjusting a position of the mode switching member in accordance with the rotational position of the actuator;

the temperature control pattern is cyclically repeated a plurality of times through the first position adjusting mechanism; and the second position adjusting mechanism adjusts the position of the mode switching member in accordance with a cyclical change of the temperature control pattern.

11. The air conditioner according to claim 10, wherein:

the first position adjusting mechanism includes a temperature control link rotated by the actuator; and the temperature control link has a temperature-control engagement groove formed into a loop-groove shape corresponding to the temperature control pattern.

12. The air conditioner according to claim 10, wherein:

the second position adjusting mechanism includes a mode switching link rotated by the actuator;

the mode switching link has a mode-switching engagement groove;

the mode-switching engagement groove has an automatic setting groove in a predetermined operation range of the mode switching link, and a manual setting groove in other operation ranges different from the predetermined operation range of the mode switching link;

the mode switching member automatically switches between the air outlet modes in accordance with a change of the temperature control unit through the automatic setting groove; and the mode switching member is fixed at one operation position through the manual setting groove irrespective of the temperature control unit in each of the other operation ranges of the distribution link, the operation positions of the mode switching member in each of the other operation ranges being different from each other.

13. The air conditioner according to claim 12, wherein the automatic setting groove is provided in an intermediate position of the manual setting groove.

14. The air conditioner according to claim 1, wherein the temperature control unit and the mode switching member are driven at different times by the actuator.

15. The air conditioner according to claim 1, further comprising:

a cooling heat exchanger, disposed in the air conditioning case, for cooling air passing therethrough; and a heating heat exchanger, disposed in the air conditioning case at a downstream air side of the cooling heat exchanger, for heating air passing therethrough, wherein the temperature control unit is an air mixing door for adjusting a ratio between an air amount passing through the heating heat exchanger and an air amount bypassing the heating heat exchanger.

16. The air conditioner according to claim 1, further comprising:

a cooling heat exchanger, disposed in the air conditioning case, for cooling air passing therethrough; and a heating heat exchanger, disposed in the air conditioning case at a downstream air side of the cooling heat exchanger, for heating air passing therethrough, wherein the temperature control unit is a heating amount control member for controlling a heating amount of air using the heating heat exchanger.

17. The air conditioner according to claim 1, wherein the mode switching member includes a plurality of mode doors which are disposed to open and close the openings, respectively.

18. The air conditioner according to claim 1, wherein the first predetermined angle is equal to the second predetermined angle.

19. The air conditioner according to claim 1, wherein the first predetermined angle is different from the second predetermined angle.

* * * * *